US007447590B2

(12) United States Patent
Arethens

(10) Patent No.: US 7,447,590 B2
(45) Date of Patent: Nov. 4, 2008

(54) ARCHITECTURE OF AN ONBOARD AIRCRAFT PILOTING AID SYSTEM

(75) Inventor: Jean-Pierre Arethens, Beaumont les Valence (FR)

(73) Assignee: Thales (FR)

( * ) Notice: Subject to any disclaimer, the term of this patent is extended or adjusted under 35 U.S.C. 154(b) by 435 days.

(21) Appl. No.: 11/290,828

(22) Filed: Dec. 1, 2005

(65) Prior Publication Data

US 2006/0167619 A1    Jul. 27, 2006

(30) Foreign Application Priority Data

Dec. 3, 2004    (FR) ................... 04 12890

(51) Int. Cl.
*G01C 21/00* (2006.01)

(52) U.S. Cl. ................... 701/216; 701/220; 342/357.14

(58) Field of Classification Search ................. None
See application file for complete search history.

(56) References Cited

U.S. PATENT DOCUMENTS

| 5,719,764 | A | * | 2/1998 | McClary ................... 700/79 |
| 5,923,286 | A | * | 7/1999 | Divakaruni ............ 342/357.06 |
| 5,969,668 | A | * | 10/1999 | Young, Jr. .................. 701/215 |
| 6,169,957 | B1 | | 1/2001 | Arethens |
| 6,172,638 | B1 | | 1/2001 | Arethens |
| 6,178,363 | B1 | * | 1/2001 | McIntyre et al. .............. 701/16 |
| 6,191,729 | B1 | | 2/2001 | Arethens |
| 6,195,040 | B1 | | 2/2001 | Arethens |
| 6,239,745 | B1 | | 5/2001 | Stratton |
| 6,424,914 | B1 | | 7/2002 | Lin |
| 7,006,035 | B2 | | 2/2006 | Arethens |
| 7,218,278 | B1 | | 5/2007 | Arethens |
| 2003/0083792 | A1 | * | 5/2003 | Anderson et al. ............. 701/16 |
| 2004/0239560 | A1 | * | 12/2004 | Coatantiec et al. ..... 342/357.14 |

FOREIGN PATENT DOCUMENTS

| CA | 2 315 899 | | 6/2000 |
| FR | 2852686 | | 9/2004 |
| WO | WO 2005/088337 A1 | * | 9/2005 |

OTHER PUBLICATIONS

U.S. Appl. No. 09/582,172, filed Dec. 23, 1998 (now abandoned) (Corresponding CA2315899 is attached).

* cited by examiner

*Primary Examiner*—Michael J. Zanelli
(74) *Attorney, Agent, or Firm*—Lowe Hauptman Ham & Berner, LLP

(57) ABSTRACT

A function for generating guidance data from the GNSS data and the inertial data ($IRS_1$) with integrated fault detection is distributed on the inertial reference units and the digital processing boards of said multimode receivers. Application to an augmented GLS guidance mode for category I to III approach operations.

12 Claims, 6 Drawing Sheets

ARCHITECTURE OF AN ONBOARD AIRCRAFT PILOTING AID SYSTEM

FIELD OF THE INVENTION

The present invention relates to an aircraft piloting aid system, used in particular to guide the aircraft in precision approach phases (landing, take-off) and maneuvers on the ground. The invention relates more particularly to the implementation of a GNSS based landing system GLS based on a GNSS satellite positioning system, which satisfies the requirements of guidance signal integrity and continuity for category I to III approaches.

It will be remembered that the integrity represents the probability that the signals are not randomly errored and the continuity represents the probability that the signals remain present and usable during the approach phase. The integrity level is defined in practice for it to be extremely improbable for the surface control system (automatic pilot) which controls the control surfaces of the airplane to use false guidance data. The continuity level is defined in practice for it to be extremely improbable for this same system to be inoperative for lack of data.

In the invention, interest is more particularly focused on an architecture of an onboard aircraft navigation and guidance system, which satisfies the continuity and integrity requirements for the guidance signals that would be supplied in a GLS mode, from equipment currently available on the market which allows only category I navigation and guidance operations for such a mode. In particular, multimode receivers MMR are currently used, which implement both ILS (Instrument Landing System) and MLS (Microwave Landing System) landing modes, which have been certified by the relevant authorities, for use in category I to III approach operations, and a satellite positioning GNSS function to supply accurate navigation information.

It will be remembered that the GNSS systems can be the American GPS system, the Russian GLONASS system and the European GALILEO system, and also cover augmentation systems which have been developed to enhance performance, in particular the accuracy of the satellite positioning system taken in isolation.

There are various augmentation systems. There are systems that use GNSS signal differential correction data, obtained either from satellites of a constellation other than the GNSS constellation (SBAS augmentation system for GPS) or a reference GNSS station on the ground via a radio data link operating in the VHF band (GBAS augmentation system). Another type of augmentation consists in using complementary location information supplied by the instruments on board the aircraft (ABAS system). There is an abundance of literature on this subject.

In the invention, interest is more particularly focused on the GBAS (Ground Based Augmentation System) or LAAS (Local Area Augmentation System) differential correction augmentation system using a ground station comprising GNSS receivers, which transmits to the MMR on board the airplane differential data for correcting GNSS signal measurements that it computes from measurements that it takes and its known positioning and ideal approach paths. Such an augmentation system is in practice incorporated in the market-standard multimode receivers MMR. In particular, it supplies the PVT (Position, Velocity, Time) data of the aircraft to a flight management system on board the aircraft, and piloting information relative to the ideal path chosen by the pilot to make an approach towards an airport.

The accuracy of the GNSS data also depends on external factors such as the disposition of the satellites in the GNSS constellation, or the number of satellites in the constellation "in sight". For example, if the satellites are not well disposed, the accuracy on the GNSS data will not be good. Other identified disturbances (random failure of a satellite, radiofrequency interference (RFI, etc)) or unidentified disturbances can also affect the reception of the GNSS signals and the augmentation signals.

DISCUSSION OF THE GENERAL BACKGROUND

While these various disturbances cannot be controlled, it is possible to detect in real time that the GNSS data is outside of limit values, and compute in real time a corresponding integrity level, by the use of algorithms ensuring a confidence interval on the position information generated by the system. In particular, various algorithms corresponding to the different GNSS configurations have been defined, even standardized, such as the "HPL/VPL" algorithm in the case of a GNSS configuration using GPS and GBAS.

Also, the GNSS-based navigation systems provide for the detection of a data integrity fault, to switch off the system if necessary: an integrity problem is thus transformed into a continuity problem, since the GNSS data is no longer available.

In parallel, solutions of hybridation with the inertial reference system IRS of the aircraft have been proposed, to overcome this continuity problem, so as to supply guidance signals in all circumstances, having the requisite accuracy and integrity.

An inertial reference system is commonplace in aircraft. It comprises gyrometers and accelerometers, and digital processing means for integrating the data from these sensors. Preferably, it also includes anemometers, which are used to obtain the vertical stability of the inertial system. The inertial reference system supplies in particular position, velocity, angular velocity, acceleration and attitude data in various fixes associated with the carrier or the ground. It can also supply information such as the wind speed, magnetic heading, etc.

The principle of a hybrid GNSS-IRS system is as follows: the navigation system uses the extremely accurate (augmented) GNSS data, provided it has sufficient integrity. The data is then also used to compute long term drifts (sensor bias) of the IRS unit, so that this unit can be realigned. When the integrity of the GNSS data is no longer sufficient, the GNSS channel is cut. The navigation system then uses the inertial position/velocity information from the IRS platform.

Since the IRS system is intrinsically less accurate than a GNSS type system, because of the accumulation over time of errors on the information output by the inertial sensors (scale factor errors, bias errors, variations with temperature, etc), its realignment by very accurate PVT information supplied by the GNSS system provides for inertial information with sufficient accuracy while the GNSS system is switched off, since sensor drift is only a factor in the long term.

Thus, a GNSS (GBAS augmented)-IRS hybrid system can be used to provide, in all circumstances, in all weathers, PVT data with the requisite level of integrity and continuity, so that its use for precision (category III) approach operations can be considered. The requisite integrity and continuity levels are achieved through the real-time realignment of the inertial reference system, and the switchover from the GNSS system to the realigned IRS system in the event of GNSS data integrity problems. In particular, numerous data hybridation methods with filtering and other hybridation methods have been developed to enhance these GNSS-IRS hybrid systems, in particular to detect the GNSS data integrity problem early enough for it not to cause an erroneous correction of the bias errors in the inertial reference system.

This data supplied by the GNSS-IRS hybrid system is used, together with the GBAS augmentation signals supplied by a ground station provided in the airport concerned (or the SBAS augmentation signals), to generate guidance signals for approach operations relating to this airport.

Such a system is called a GNSS-based landing system (GLS), augmented by inertial equipment.

Such a GLS system indeed offers many advantages over the ILS and MLS systems currently used for precision approach operations. In particular, the satellite signals are available everywhere, the GBAS (or SBAS) differential augmentation is used to obtain the necessary accuracy and the operational maintenance of such a system is made much easier, because it is almost entirely digital.

The ILS and MLS landing aid systems do pose a practical problem of cost, both for purchase and maintenance. In particular, protecting an ILS or MLS ground station against the interference factors hampering data transmission increases the running costs of these systems. In particular, to ensure the high level of integrity and continuity of the guidance data required in low visibility conditions, the use of the ILS or MLS systems is subject to draconian operating restrictions. Also, in low visibility situations, the number of guidance operations per hour performed in an airport drops accordingly. This poses a major problem in all airports where poor weather conditions are commonplace.

For all these reasons, a GLS system is theoretically very attractive compared to the ILS or MLS systems.

One object of the invention is to propose a GLS system based on a GBAS (or SBAS) augmented GNSS system and a GNSS-IRS hybridation.

Another object of the invention is to use an existing navigation and guidance architecture, with market-standard equipment, in particular multimode receivers MMR of the state of the art, in order to propose an inexpensive GLS system.

BACKGROUND OF THE INVENTION

A navigation and guidance system of the state of the art with GBAS augmentation and GNSS-IRS hybridation is diagrammatically represented in FIG. 1. It mainly comprises a flight management system FMS, a flight control system FCS, a radio management panel RMP, an ILS/MLS multimode receiver MMR device and an inertial reference system IRS.

The control data and signals pass between the various units via standardized buses (ARINC buses).

The flight management system FMS controls the various elements of the system, in particular selection of the guidance mode, according to the flight plan drawn up by the pilot (according to the capabilities of the airport in particular), and the provision of the information and data needed for the various elements, directly or via the radio management panel RMP.

The flight control system FCS generates the surface control signals for the aircraft according to the guidance signals that it receives.

A multimode receiver $MMR_r$ is detailed in FIG. 2. It supplies the guidance signals $GUID_r$ for the precision approach operations, according to the MLS or ILS guidance mode controlled by the radio management panel $RMP_r$, to perform an approach suited to the means available at the airport concerned. In practice, according to the "multimode" concept, specific reception and analogue/digital conversion stages are provided for the signals $S_{MLS}$ transmitted by the MLS ground stations, and for the signals $S_{glide}$ and $S_{loc}$ transmitted by the ILS ground stations.

An element supplying guidance information for the most critical operations (CATIII landing) needs to ensure the integrity of the digital processes that it carries out. To do this, it incorporates a dual architecture: digital processing boards $CPU_1$, $CPU_2$ each generate guidance signals $GUID_1$, $GUID_2$ respectively from the data received from the ground stations according to the selected mode. These boards incorporate a function for mutually checking the data generated, in order to ensure the integrity of the processes carried out and allow the output of the guidance data from the guidance signals only if the data is similar. These aspects are well known to those skilled in the art. The digital processing means of the guidance unit implement the MLS or ILS processing modules according to the choice of the pilot. On output, guidance signals $GUID_r$ are obtained. According to the "look alike" concept, these guidance signals are normally presented in the well known standardized format of the ILS mode.

The multimode receiver device outputs guidance data, derived either from the ILS subsystem or from the MLS subsystem for category III approach operations, to the surface control FCS system.

It even supplies navigation data (augmented), denoted $D_{GPS}$, in other words, in particular the PVT information and an associated integrity level, as well as the satellite signal measurements, to the IRS system. A GNSS signal reception stage and a GBAS and/or SBAS augmentation signal reception stage are provided. In practice, regarding the GBAS augmentation signals, denoted $S_{aug}$ in FIG. 2, the latter are, like the ILS loc signals, VHS signals that can, if necessary, be acquired by the loc VHF receiver used ($S_{loc}$) in the ILS mode. However, the MMR receiver can also include a dedicated reception and A/D conversion board, normally called a video data broadcast (VDB) board. More commonly, and as shown in FIG. 2, it uses the ILS mode loc signal ($S_{loc}$) reception and A/D conversion board, this board normally spanning the frequency range of the GBAS augmentation signals.

The IRS system supplies inertial PV data, denoted $D_{IRS}$ in the figure, to the flight management system $FMS_r$. The system $FMS_r$ also controls the radio management panel $RMP_r$, according to the hybrid PVT data HYB and the flight plan provided. This unit $RMP_r$ in particular controls the active navigation/guidance mode of the receiver $MMR_r$: ILS, MLS or GLS. In particular, with current flight management systems, the guidance means offered by the airport at which or from which an approach operation is carried out, and the weather conditions, condition the choice of the guidance mode.

Moreover, the GNSS processing subsystem receives from the $IRS_r$ system, the hybrid PV data HYB.

As diagrammatically represented in FIGS. 1a, 1b and 2, an architecture of such a navigation system needs to be of the type including integrated fault detection, to satisfy the integrity and continuity requirements of the application. Because of this, aircraft normally have an architecture of the double, even triple, subsystem type, with integrated checking functions.

In practice, to satisfy the demands of integrity and continuity of the guidance signals for all-weather approach operations, it is essential for each element of a guidance data processing subsystem to present a very low failure rate, typically less than $10^{-9}$ errors per hour of flight.

Thus, to meet the requisite integrity and continuity levels, the architecture of an onboard aircraft piloting aid system and the very elements of this system need to be of the double or triple subsystem redundancy type and incorporate internal checking functions, so as to detect a failure of an individual element. The system and the elements are said to be of the fault-tolerant type, because they incorporate checking functions for detecting faults and providing alarms.

At the conventional system architecture level, and as diagrammatically represented in FIG. 1a, the various elements are thus duplicated or triplicated. Typically, the multimode receiver device comprises two MMR receivers, denoted $MMR_r$ and $MMR_l$, the flight management system FMS comprises two units, denoted $FMS_r$ and $FMS_l$, the radio management panel RMP comprises two units, denoted $RMP_r$ and $RMP_l$, and the surface control system comprises two units, denoted $FCS_r$ and $FCS_l$. Integrated fault-detection functions are included, as will be seen later.

Regarding the inertial reference system, it normally comprises a fault-tolerant structure (Fault-Tolerant Inertial Reference System). Typically, such a system has a triple-subsystem type architecture, with three data input/output buses, at least three sensors of each type and associated signal processing means. Preferably, the IRS system is of the type including integrated anemometric data measurement. The acronym "FT/ADIRS", standing for "Fault-Tolerant Air Data Inertial Reference System" is used to qualify the system, with fault detection covering the paths for acquiring the sensor data and processing this data. A standard diagrammatic representation of such a system of the triple-subsystem type is that of three units in parallel, denoted ADIRU. FIG. 1a thus shows an IRS system with triple subsystems $ADIRU_1$, $ADIRU_2$, $ADIRU_3$. Each unit includes its own digital processing means, and has its associated input/output bus. Normally, these three input/output buses are linked in input/output mode to the GNS subsystem of each of the multimode receivers $MMR_r$ and $MMR_l$, and to the flight management systems $FMS_r$ and $FMS_l$ as shown in FIG. 1b for the interface with the input/output bus of the unit $ADIRU_3$ (to avoid cluttering the figure, the input/output buses with $ADIRU_1$ and $ADIRU_2$ are not shown).

The IRS system supplies output data as long as at least two of the units are detected without faults. Integrated data comparison and checking functions are provided, to disable a data path or a guidance mode if faults are detected (not shown). In particular, the guidance signals $GUID_r$ and $GUID_l$ supplied by the two receivers $MMR_r$ and $MMR_l$ are applied to the two surface control systems $FCS_r$ and $FCS_l$ which run an internal check on this data. FIG. 3 illustrates an integrated checking function F4 implemented in practice by each surface control system $FCS_r$ and $FCS_l$ on the guidance data $GUID_r$ and $GUID_l$. In the event of a data discrepancy, a corresponding disabling signal is generated, $Dis_{guid}$, which, in the example illustrated, prevents the transmission of the signals output from the automatic pilots ($FCS_r$ and $FCS_l$) to the control surface control circuits. It can also activate an alarm.

At element level, each onboard multimode receiver $MMR_r$, $MMR_l$ normally includes a dual digital processing subsystem for the ILS radiofrequency or MLS microwave signals. In practice, a digital processing board can normally guarantee at best only $10^{-6}$ errors per hour of flight greater than the error risk tolerated for the application, this risk typically being evaluated at $10^{-9}$ errors per hour of flight. Such a level can be achieved only by using redundant architectures. Thus, as already described with respect to FIG. 2 for the receiver $MMR_r$, two digital computation boards $CPU_1$ and $CPU_2$ are thus provided in each receiver. These boards generate redundant guidance signals $GUID_1$ and $GUID_2$. A mutual checking function for detecting faults is implemented in each board to control alarm lamps and prevent the output of guidance signals from the receiver (signal Dis-G in FIG. 2).

As for the ILS radiofrequency or MLS signal reception subsystem, the analogue/digital boards A/D for receiving corresponding radiofrequency signals normally present failure rates well below the error risk tolerated for the application, the risk being typically estimated at $10^{-9}$ errors per hour of flight. Also, the receivers MMR include only one A/D reception board for each radiofrequency signal type (reception board for the $S_{glide}$ and $S_{loc}$ signals of the ILS mode and microwave board for the $S_{MLS}$ signals of the MLS mode), in order to reduce the costs of the elements and their size. It will be seen from the example shown in FIG. 2, that the augmentation signals $S_{gbas}$ are received by the same reception means as the loc signal $S_{loc}$ of the ILS system.

The GBAS correction VHF signals are processed by the digital board CPU1 to extract the data from the messages transmitted by the ground station. It must be noted that, to ensure the integrity of the reception of these messages, there is no need to duplicate the processing on the digital board CPU2, because these messages incorporate a cyclic redundancy code type checking mechanism to ensure the integrity of the decoding of their content. The decoded signals are then transmitted to the digital board CPU3 which handles the GNSS function processes.

As for the GNSS signal reception and processing subsystem, this is normally single-subsystem with state of the art multimode receivers, with no internal checking function. This system was in practice originally designed solely for navigation and category I approaches, in other words, for use during the phases of the flight plan outside the most critical category III approach and landing phases. There is therefore a reception and A/D conversion module for the GNSS signals, denoted $S_{GPS}$, and, if necessary, for the SBAS augmentation signals, denoted $S_{sbas}$. A single digital processing board, CPU3 in the figure, is thus provided to process the GNSS signals ($S_{GPS}$), with the augmentation signals $S_{aug}$ (SBAS or GBAS), to supply the output data $D_{GPS}$ to the inertial reference system and/or the flight management system module associated with the receiver, or $FMS_r$ for the receiver $MMR_r$.

It will be understood that the architecture of the system with a single GNSS subsystem is insufficient to satisfy the integrity and continuity imperatives of the application in category III mode. In particular, the board $CPU_3$ has a characteristic failure rate that is far too high. For an MMR element capable of supplying independently the guidance deviations in GLS mode, it would therefore be necessary to duplicate the GNSS subsystem, at least for this reason, in the same way as for the guidance data computation subsystem ($CPU_1$/$CPU_2$), to obtain the same fault tolerance levels as those of the ILS/MLS navigation modes.

Such a solution therefore entails reviewing the current architecture of the onboard multimode receivers, resulting in a high development cost for the definition, debugging and certification of this new architecture. Furthermore, the GNSS-IRS data hybridation aspects add new fault detection constraints, such that duplicating the GNSS subsystem might not be enough to resolve the problem adequately, resulting in a more complete revision of the very system architecture.

SUMMARY OF THE INVENTION

In the invention, the aim is to propose a less expensive navigation system capable of providing a category III GLS service.

One object of the invention is to propose a solution for a GLS system for category III precision approach operations using existing equipment, and more particularly, using the architecture of an onboard aircraft piloting aid system, including a multimode receiver device with GNSS satellite positioning system and integrated augmentation system, typically, at least a GBAS/LAAS system, and/or an SBAS system, and an inertial reference system with GNSS/IRS hybridation.

The fundamental idea of the invention is to use the existing architecture, and to distribute the various GLS guidance signal processing functions sensibly, in order to obtain the redundancy required at each step, using the various elements of this architecture, the integrated checking functions and the existing physical links. Implementing the invention then simply entails modifying the programs implemented in the various digital processing boards of the architecture.

In the invention, the different processing functions to be distributed have been identified, including the functions for processing the guidance process based on GNSS data, but also the checking functions for detecting a failure on an individual element of the processing subsystem. These checking functions themselves need to ensure the requisite integrity and continuity levels.

It is shown that, by relying solely on the existing system architecture and by sensibly distributing the functions to be implemented, a GLS-IRS hybrid architecture is obtained which presents integrity and continuity levels that are adequate to ensure guidance in precision approach mode (category III), in all weathers.

Such a hybrid architecture according to the invention satisfies the real requirement for inexpensive (purchasing and maintenance), accurate and reliable guidance systems for precision approach operations, regardless of the weather conditions, and that can be used anywhere in the world.

The invention thus relates to an aircraft piloting aid system, with GNSS-IRS hybridation, designed for onboard installation in an aircraft, comprising an inertial reference system IRS with at least two inertial reference units, each supplying a set of inertial data, and at least a first multimode receiver supplying a first set of guidance signals and a first set of augmented GNSS data, a second multimode receiver supplying a second set of guidance signals and a second set of augmented GNSS data, each receiver including two digital processing boards with a mutual checking function for the data generated by each of said digital processing boards to supply said set of guidance signals, and a single augmented GNSS signal processing board, supplying said set of augmented GNSS data, characterized in that a function for generating guidance data from the GNSS data and the inertial data with integrated fault detection is distributed on said inertial reference units and said digital processing boards of said multimode receivers.

According to an aspect of the invention, this distribution is such that:
 the first set of augmented GNSS data and the second set of augmented GNSS data are applied as input to each of the inertial reference units, each inertial reference unit including an integrated function for comparing said sets of data, to disable the transmission of said sets of data if necessary,
 each inertial reference unit applies a hybridation function between one of said sets of transmitted GNSS data and the inertial data that said unit supplies, to deliver a set of hybrid data,
 the digital processing boards of each multimode receiver each incorporate a function for comparing the sets of hybrid data supplied by the inertial reference units, to supply, if appropriate, a fault detection signal, a function for generating corresponding guidance data and a function for checking said guidance data with the guidance data created by the other board.

The invention also relates to use in an aircraft of such a piloting aid system, to implement an inertially augmented GLS guidance for category I to III approach operations.

Still and other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

FIG. 1a illustrates an architecture of an onboard aircraft piloting aid system with GNSS-IRS hybridation according to the state of the art;

FIG. 1b details the input/output links between the various elements of the architecture;

FIG. 2 diagrammatically illustrates the redundant architecture of an onboard multimode receiver MMR according to the state of the art;

Figure 1A:
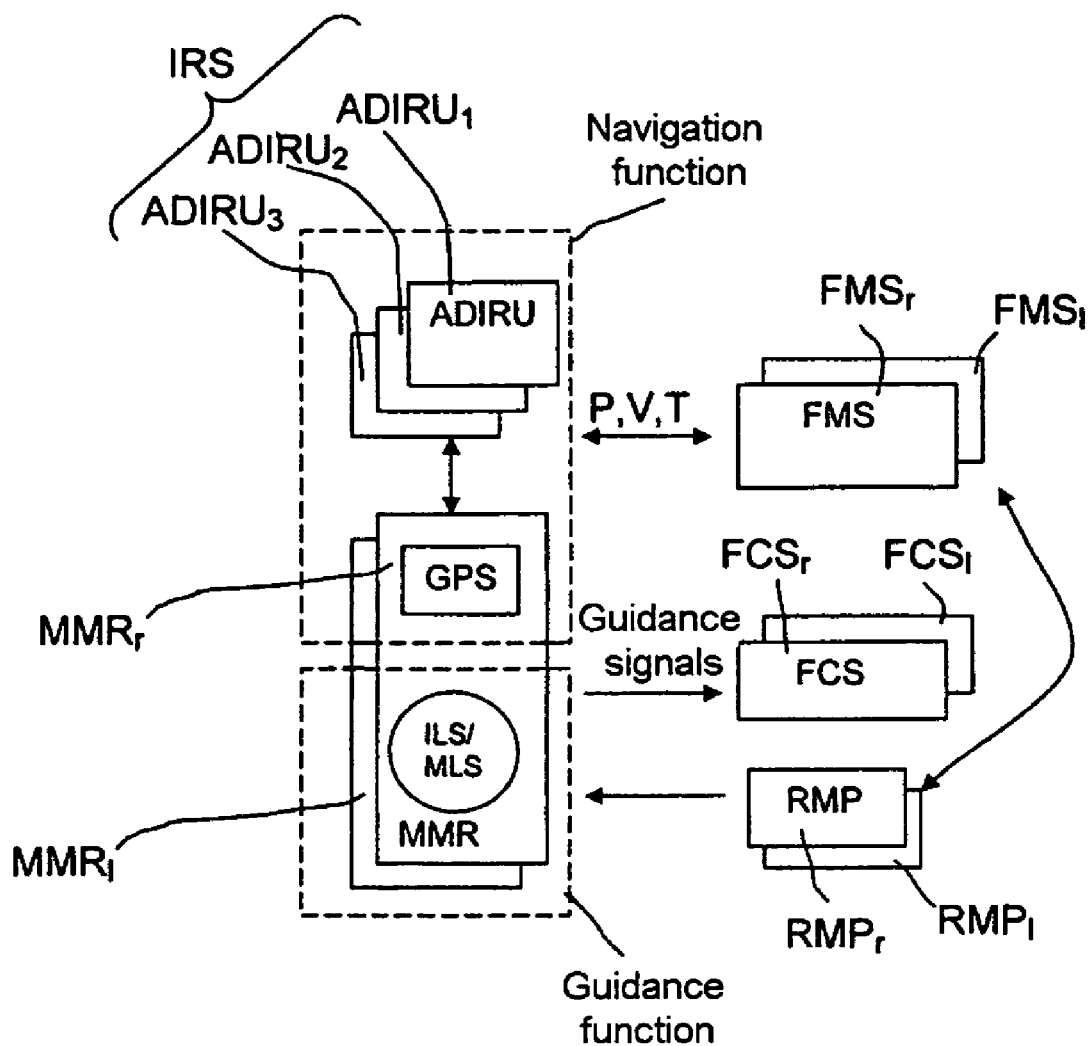
Figure 1B:
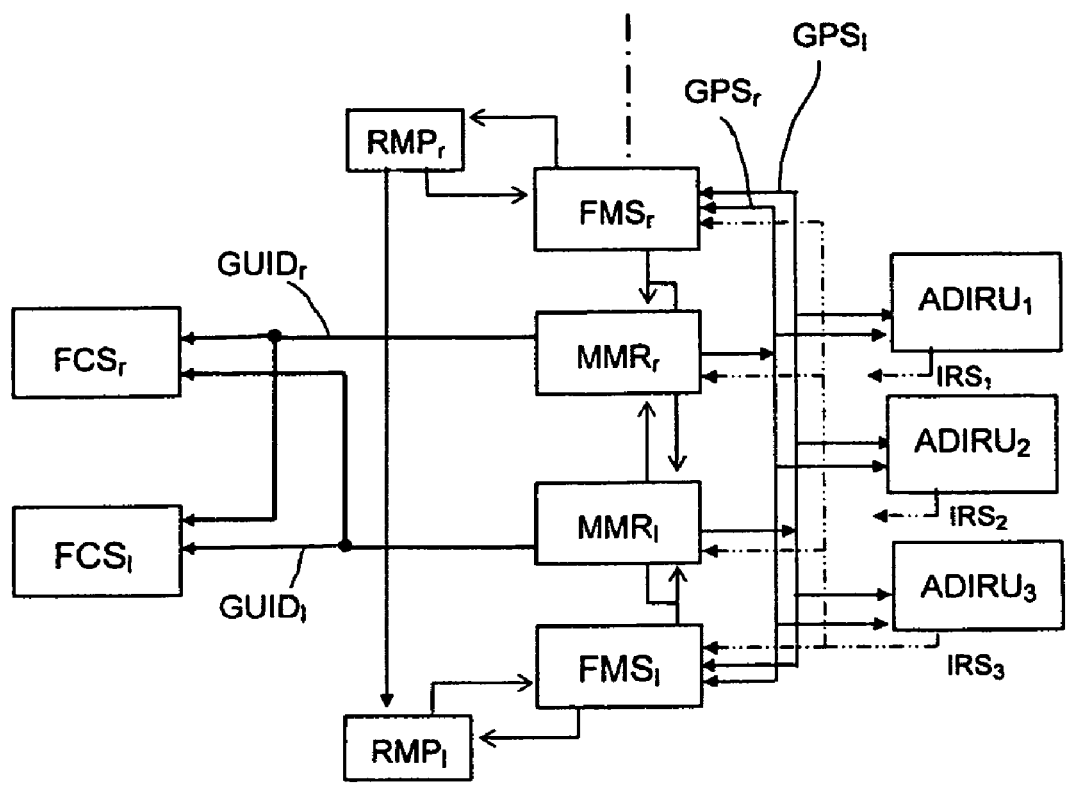
Figure 5:
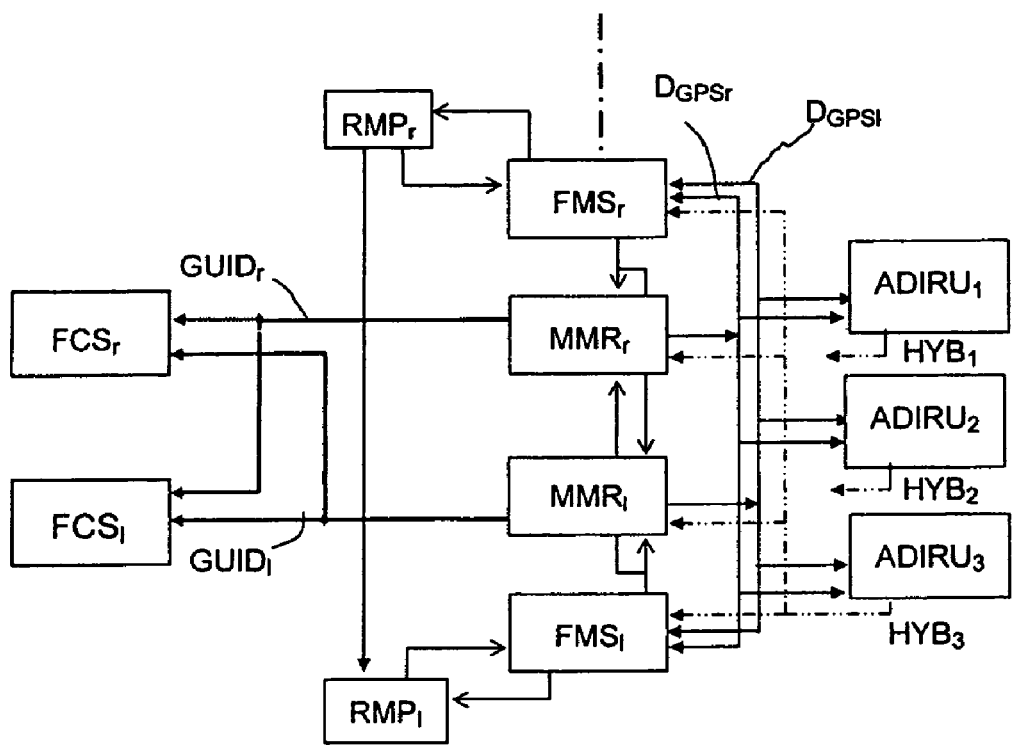
Figure 6:
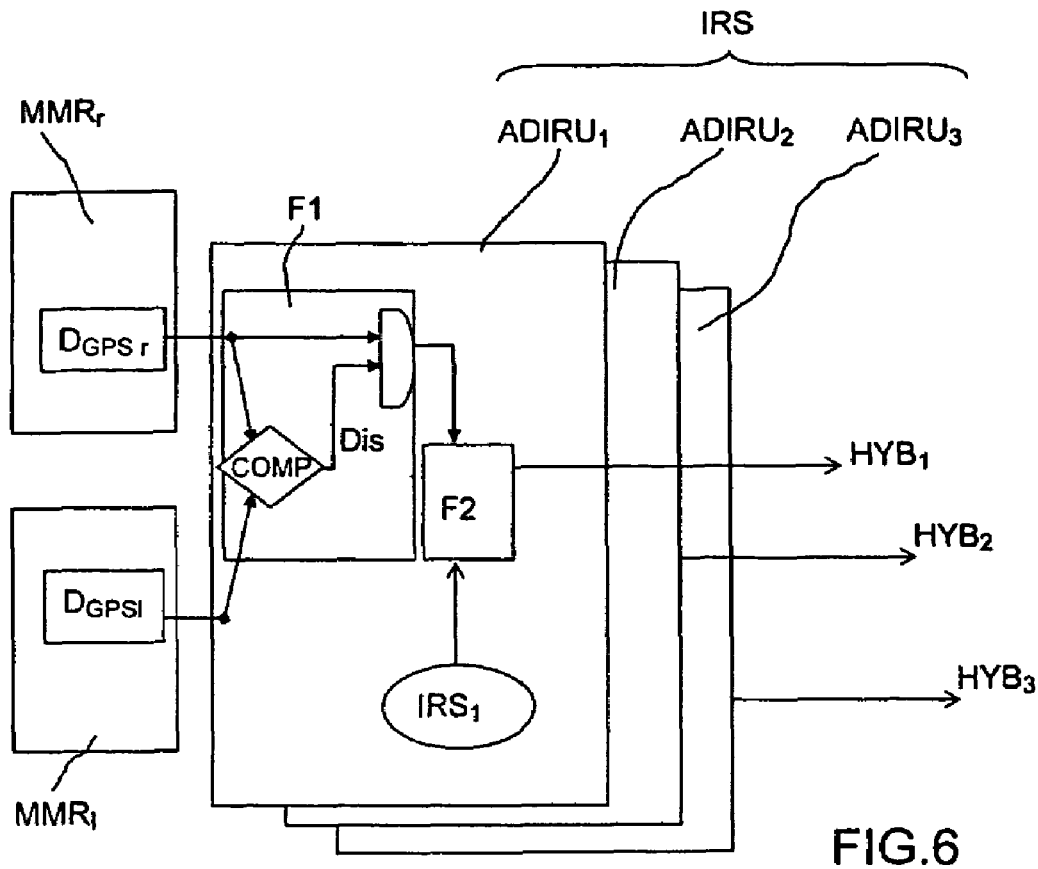
Figure 7:
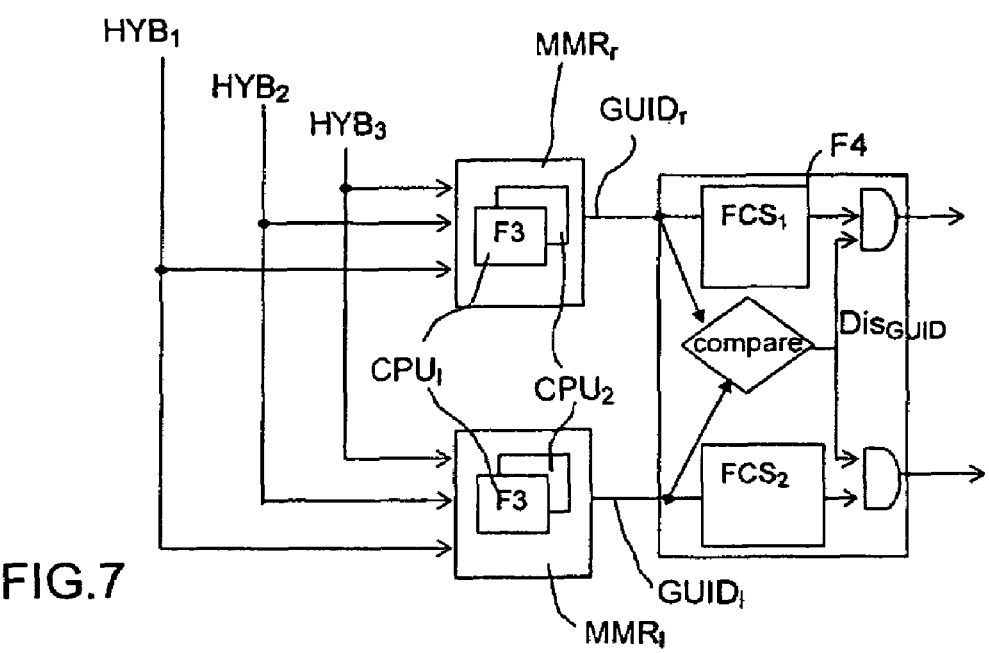
Figure 8:
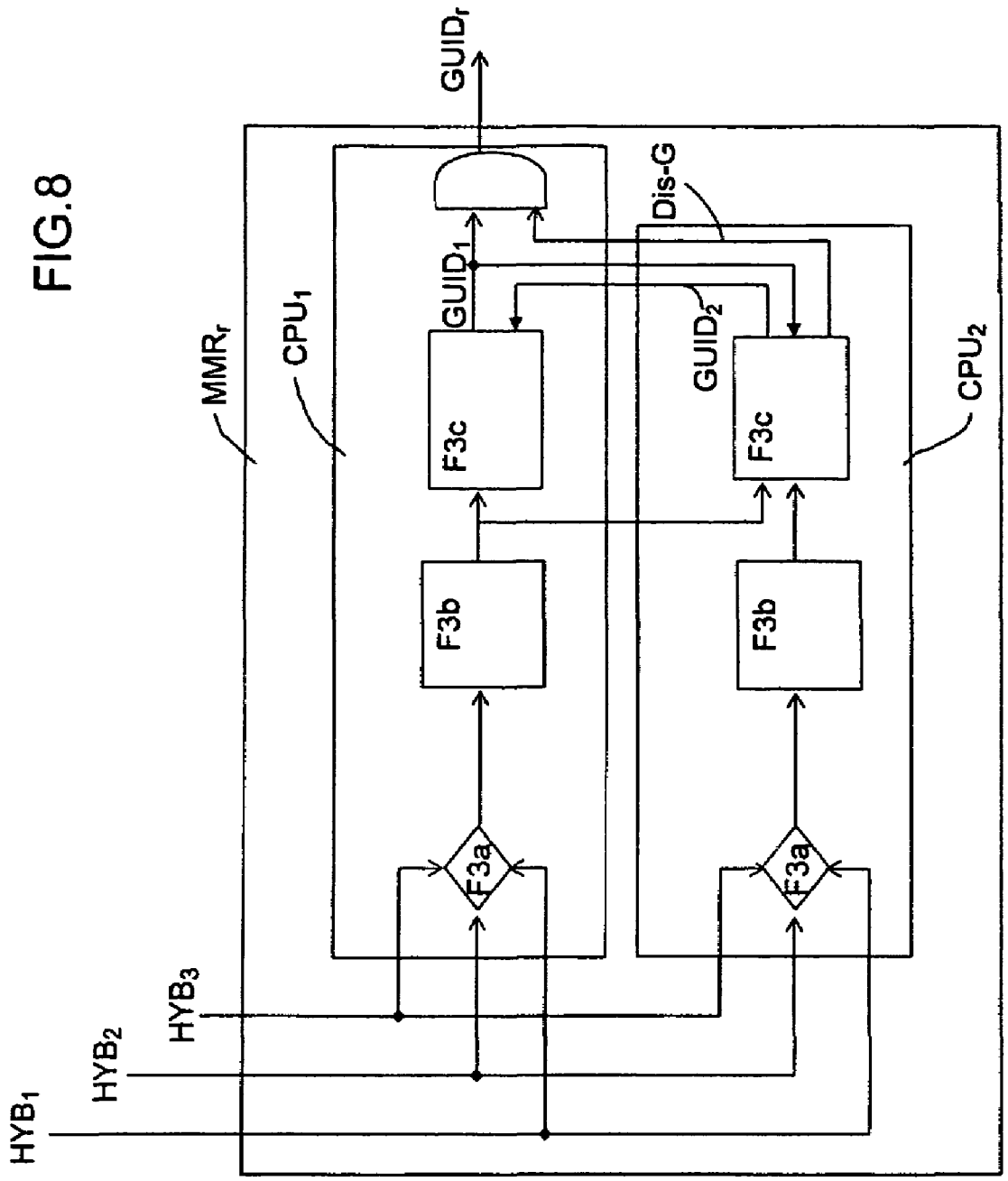

FIG. 5 corresponds to FIG. 1b, adapted to an implementation of a distribution of the GLS functions according to the invention;

FIG. 6 is a block diagram of the functions implemented by the elements of the inertial reference system IRS architecture, FIG. 7 is a block diagram of the functions implemented by the receivers MMR$_r$ and MMR$_l$ of the multimode reception device and the units FCS$_r$ and FCS$_l$ of the surface control system FCS; and FIG. 8 illustrates in detail the processing and control functions implemented on the hybrid data in a receiver.

DESCRIPTION OF A PREFERRED EMBODIMENT

In the description below, and with reference to the figures, the following notations are used:
 $D_{GPSr}$, $D_{GPSl}$ designate the data obtained from the GNSS signals $S_{GPS}$ and augmentation signals $S_{aug}$, typically the GBAS augmentation signals, or even the SBAS augmentation signals. This data is supplied as output from the receivers MMR$_r$, MMR$_l$ respectively.
 IRS$_i$ designates the inertial data supplied by the inertial reference ADIRU$_i$ unit i of the IRS system over an associated input/output bus.
 HYB$_i$ designates the hybrid data between the data $D_{GPSr}$ and/or $D_{GPSl}$ and the inertial data from the unit ADIRU$_i$ of the inertial reference system.

Figure 2:
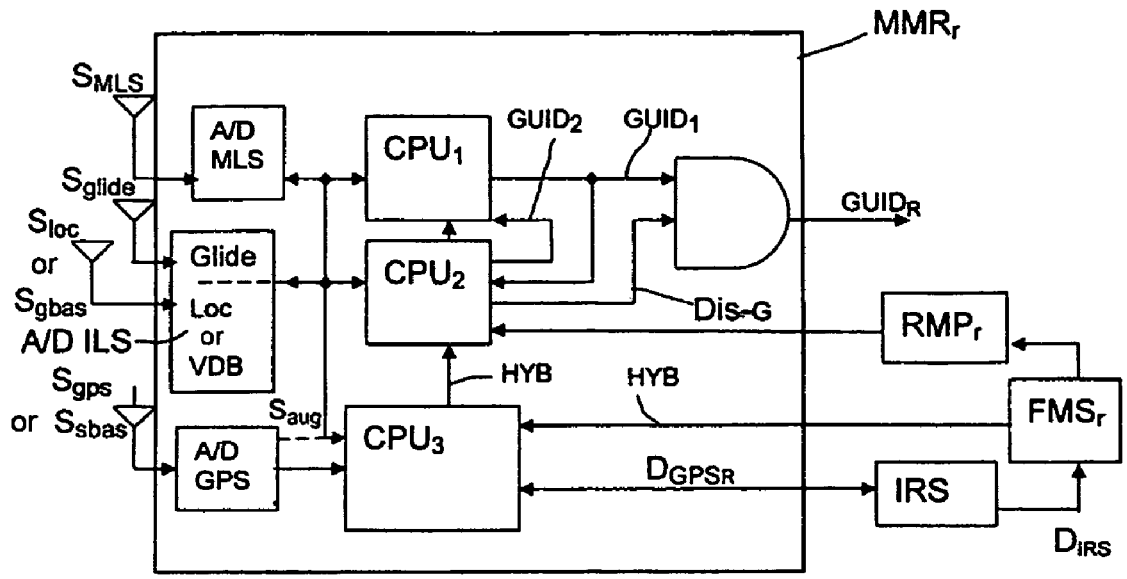

A distribution according to the invention of the functions of the GLS processing subsystem is based on the existing redundant structures of the navigation system as previously described and illustrated in FIGS. 1a, 1b and 2. In particular, this distribution relies on the links provided between the various elements, in particular, the interface between the GNSS unit of each MMR, $MMR_1$ and $MMR_2$, and each of the input/output buses of the three units $ADIRU_1$, $ADIRU_2$ and $ADIRU_3$ of the inertial reference system IRS as illustrated in FIG. 1b.

More particularly, the invention proposes to use the triple subsystem structure of the IRS system on the one hand and the double internal and system redundancy of the multimode receiver device: system redundancy with the two receivers $MMR_1$ and $MMR_2$, and internal redundancy of these receivers $MMR_r$ and $MMR_l$ with the boards $CPU_1$ and $CPU_2$ with integrated fault detection function, to implement a GLS guidance mode, using the GNSS signals, the augmentation signals (GBAS or SBAS) and hybridation of the GNSS and IRS systems, in a fault-tolerant type processing subsystem.

Figure 4:
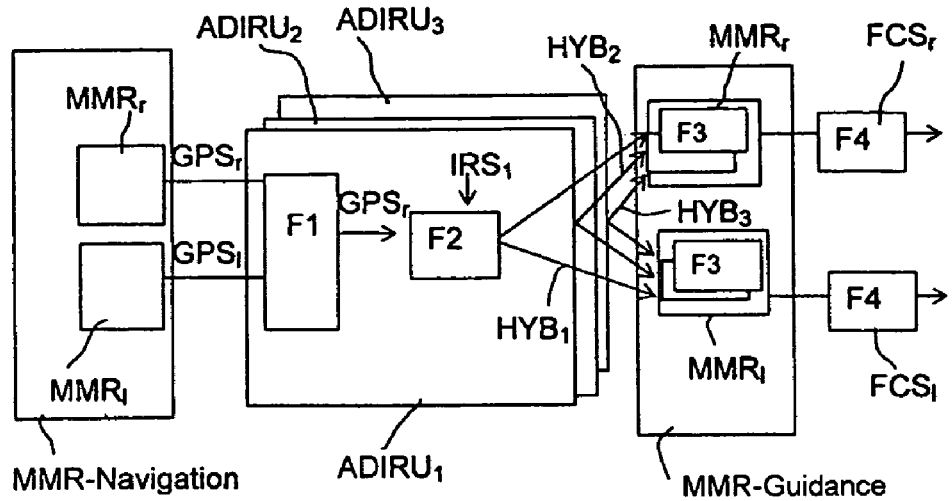
FIG. 4 is a block diagram of the system architecture, with a representation of the distribution of the functions of the GLSS processing subsystem.

According to the invention, this fault-tolerant type GLS guidance data processing subsystem is obtained in a very powerful way by relying on a breakdown of the processing into four main functions F1 to F4, as represented in FIG. 4, and a distribution of these functions on the inertial reference system IRS and on the digital boards $CPU_1$ and $CPU_2$ of the multimode receivers $MMR_r$ and $MMR_l$.

These functions F1 to F4 can be separated into two groups according to whether they are processed in the navigation part (IRS) or in the guidance part (multimode receivers, surface control system units).

In the navigation part, the following two functions F1 and F2 are defined:

F1: checking the integrity of the GNSS data supplied by each of the receivers $MMR_1$ and $MMR_2$ of the system architecture.

F2: hybridation function for the GNSS data and the inertial data.

In the guidance part, the following two functions F3 and F4 are defined:

F3: checking the integrity of the hybrid data and generating GLS guidance data.

F4: checking the integrity of the GLS guidance data.

The functions F1 and F2 are diagrammatically represented in FIG. 6. The receiver $MMR_r$ supplies the data $D_{GPSr}$, and the receiver $MMR_l$ supplies the data $D_{GPSl}$ from their respective subsystems for acquiring and processing GNSS signals $S_{GPS}$ and augmentation signals $S_{aug}$.

This data is supplied to each of the units $ADIRU_1$, $ADIRU_2$, $ADIRU_3$ of the IRS system.

Each unit $ADIRU_i$ implements the functions F1 and F2, in a respective digital computation device. These functions are detailed in the example for $ADIRU_1$, with reference to FIG. 6.

The function F1 checks the integrity of the data $D_{GPSr}$ and $D_{GPSl}$ typically by comparing the data. If, by convention, $D_{GPSr}$ represents the data from the "main path" and $D_{GPSl}$ represents the data from the "check path", the function F1 enables the transmission of the data $D_{GPSr}$ from the "main path" to the next function F2, if the integrity check result is positive. Otherwise, a disable signal and/or alarm is generated, which prevents the transition to the following function F2.

The function F2 consists in applying hybridation algorithms between the data $D_{GPSr}$ and the inertial data from the IRS system unit concerned, $ADIRU_1$ in the example. The hybridation algorithms are well known to those skilled in the art. They are not the subject of the invention, and will not therefore be described. It should simply be remembered that, dependent on the GNSS integrity level transmitted in the data $D_{GPSr}$, this function supplies as hybrid data for navigation, either the GNSS data that it then uses to realign the sensors of this unit $ADIRU_1$, or the data $IRS_1$ of this unit $ADIRU_1$.

It will be noted, however, that implementing the hybridation function in the units $ADIRU_i$ is particularly advantageous, because it is situated as near as possible to the inertial sensors, to the measurements of which it must apply the corrections computed from the GNSS data (realignment).

The function F2 outputs the hybrid data PVT. There is therefore obtained at the output of each unit $ADIRU_1$, $ADIRU_2$, $ADIRU_3$, corresponding hybrid data $HYB_1$, $HYB_2$, $HYB_3$, respectively.

This data is transmitted to both flight management systems $FMS_r$ and $FMS_l$ and to both receivers $MMR_r$ and $MMR_l$ via the input/output bus of each $ADIRU_i$. Thus, if FIGS. 1b and 5 are compared, the latter representing the implementation of the invention on the system architecture of FIG. 1b, it is no longer the inertial data $IRS_1$, $IRS_2$, $IRS_3$ that passes over the input/output buses of the units $ADIRU_i$, but the data from hybridation: $HYB_1$, $HYB_2$, $HYB_3$.

The functions F3 and F4, implemented in the guidance part, are diagrammatically represented in FIG. 7.

The function F3 is more particularly detailed in FIG. 8. It is implemented in the boards $CPU_1$ and $CPU_2$ of each of the receivers $MMR_r$ and $MMR_l$, thus using the double internal and system redundancy of these elements. It includes an integrity check function F3a, a guidance computation function F3b, and a function F3c for mutually checking the guidance data supplied by each board.

The integrity check F3a is implemented in each board $CPU_1$ and $CPU_2$ to check the hybrid data $HYB_1$, $HYB_2$, $HYB_3$ output by the three units $ADIRU_i$. This check is performed typically according to the following rule: as long as at least two sets of hybrid data coincide, they are enabled. For example, each CPU board applies to the enabled hybrid data, for example $HYB_1$, the function F3b, which consists in applying the algorithms for guidance signal generation and standardized output formatting (typically the ILS format). There is then the mutual check function F3c already described with regard to FIG. 2, which enables or disables (Dis-G) the data from the main channel, in the example the output data $GUID_1$ from the board $CPU_1$, by mutual comparison of the data $GUID_1$ and $GUID_2$ supplied by the boards $CPU_1$ and $CPU_2$, respectively.

Figure 3:
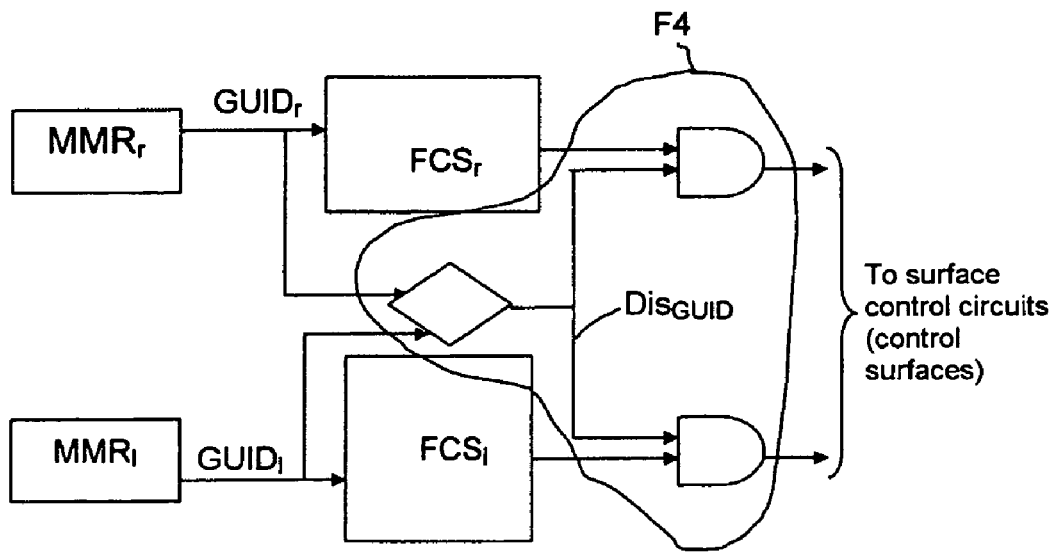
FIG. 3 illustrates an integrated fault detection function, associated with the guidance data supplied by the receivers MMR$_r$ and MMR$_l$ of the onboard system of FIG. 1.

The function F4 is the function for internally checking the guidance data $GUID_r$ and $GUID_l$ respectively from the receiver $MMR_r$ and $MMR_l$, implemented in the surface control systems $FCS_r$ and $FCS_l$ as already described with regard to FIG. 3.

The distribution of the GLS mode guidance data processing on the architecture with double receiver MMR and triple inertial subsystem of the state of the art, provides for the redundancy that the single GNSS acquisition subsystem cannot provide on its own.

Implementing the invention, as has just been seen, entails only implementing additional functions in the digital computation units of the MMR and IRS elements, without changing the architecture at equipment or hardware interface level. This raises no particular problems and can be done inexpensively.

The internal check functions used F1, F3a, F3c and F4 are in practice functions well known to those skilled in the art who can implement them easily. Their implementation as illustrated would not represent a limitation on the scope of the invention.

Moreover, the invention applies equally to IRS system architectures of the double, and not triple, subsystem type. The resulting modifications consist mainly for the function F3 in receiving as input only two sets of hybrid data.

Finally, the augmentation signals can be of the GBAS and/or SBAS type.

The invention applies to the field of avionics in general, for an implementation of a GLS guidance mode in a GNSS-IRS hybridation system, of the double multimode receiver and inertial reference system with redundant architecture type, using GBAS and/or SBAS augmentation signals, for category I to III precision approach operations.

The invention claimed is:

1. Aircraft piloting aid system, with GNSS-IRS hybridation, designed for onboard installation in an aircraft, comprising:
    an inertial reference system IRS with at least two inertial reference units, each supplying a set of inertial data and at least;
    a first multimode receiver supplying a first set of guidance signals and a first set of augmented GNSS data,
    a second multimode receiver supplying a second set of guidance signals and a second set of augmented GNSS data, each receiver including two digital processing boards with a mutual checking function for the data generated by each of said digital processing boards to supply said set of guidance signals, and
    a single augmented GNSS signal processing board, supplying said respective set of augmented GNSS data, wherein a function for generating guidance data from the GNSS data and the inertial data with integrated fault detection is performed in a distributed manner by said inertial reference units and said digital processing boards of said multimode receivers.

2. Aircraft piloting aid system according to claim 1, wherein:
    the first set of augmented GNSS data and the second set of augmented GNSS data are applied as input to each of the inertial reference units, each inertial reference unit including an integrated function for comparing said sets of data, in order to enable or disable a transmission of said sets of GNSS data to each inertial reference unit, and wherein:
    each inertial reference unit applies a hybridation function between one of said sets of transmitted GNSS data and the inertial data that said unit supplies, to deliver a set of hybrid data,
    the digital processing boards of each multimode receiver each incorporate a function for comparing the sets of hybrid data supplied by the inertial reference units, to supply, if appropriate, a fault detection signal, a function for generating corresponding guidance data and a function for checking said guidance data with the guidance data created by the other board.

3. Aircraft piloting aid system according to claim 1, wherein the inertial reference system includes three inertial reference units.

4. Aircraft piloting aid system according to claim 1, wherein the inertial reference system is of the anemometric data type.

5. Aircraft piloting aid system according to claim 1, wherein the augmented GNSS data is of the type with GBAS and/or SBAS augmentation.

6. Aircraft piloting aid system according to claim 1, configured to implement an inertially augmented GLS guidance for category I to III approach operations.

7. Onboard Aircraft piloting aid system, with GNSS-IRS hybridation, wherein said system comprises:
    an inertial reference system IRS supplying inertial data, said inertial reference system comprising at least a first and a second inertial reference units,
    at least a first and a second multimode receivers, each of said first and second multimode receivers including a first and a second digital processing boards with a mutual checking function for the data generated by each of said first and second digital processing boards, and
    a single augmented GNSS signal processing board supplying augmented GNSS data,
    wherein function for generating guidance data from the GNSS data and the inertial data with integrated fault detection is performed in a distributed manner by said first and second inertial reference units and said digital processing boards of said first and second multimode receivers.

8. Onboard Aircraft piloting aid system according to claim 7, wherein said first multimode receiver supplies a first set of guidance signals and a first set of augmented GNSS data, wherein said second multimode receiver supplies a second set of guidance signals and a second set of augmented GNSS data, wherein:
    the first set of augmented GNSS data and the second set of augmented GNSS data are applied as input to each of the inertial reference units, each inertial reference unit including an integrated function for comparing said sets of data, in order to enable or disable a transmission of said sets of GNSS data to each inertial reference unit, and wherein
    each inertial reference unit applies a hybridation function between one of said sets of transmitted GNSS data and the inertial data that said unit supplies, to deliver a set of hybrid data,
    the digital processing boards of each multimode receiver each incorporate a function for comparing the sets of hybrid data supplied by the inertial reference units, to supply, if appropriate, a fault detection signal, a function for generating corresponding guidance data and a function for checking said guidance data with the guidance data created by the other board.

9. Onboard aircraft piloting aid system according to claim 7, wherein the inertial reference system includes three inertial reference units.

10. Onboard aircraft piloting aid system according to claim 7, wherein the inertial reference system is of the anemometric data type.

11. Onboard aircraft piloting aid system according to claim 7, wherein the augmented GNSS data is of the type with GBAS and/or SBAS augmentation.

12. Onboard aircraft piloting aid system according to claim 7 configured to implement an inertially augmented GLS guidance for category I to III approach operations.

* * * * *